(12) United States Patent
Le Gonidec et al.

(10) Patent No.: US 10,393,624 B2
(45) Date of Patent: Aug. 27, 2019

(54) INFORMATION PROCESSOR SYSTEM FOR MONITORING A COMPLEX SYSTEM

(71) Applicant: SAFRAN AIRCRAFT ENGINES, Paris (FR)

(72) Inventors: Serge Le Gonidec, Vernon (FR); Dimitri Malikov, Paris (FR); Ion Berechet, Vincennes (FR); Stefan Berechet, Fontenay Sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 998 days.

(21) Appl. No.: 14/400,374

(22) PCT Filed: May 22, 2013

(86) PCT No.: PCT/FR2013/051107
§ 371 (c)(1),
(2) Date: Nov. 11, 2014

(87) PCT Pub. No.: WO2013/178913
PCT Pub. Date: Dec. 5, 2013

(65) Prior Publication Data
US 2015/0142366 A1 May 21, 2015

(30) Foreign Application Priority Data
May 28, 2012 (FR) ...................................... 12 54902

(51) Int. Cl.
*G01M 15/00* (2006.01)
*G05B 23/02* (2006.01)

(52) U.S. Cl.
CPC ......... *G01M 15/00* (2013.01); *G05B 23/0218* (2013.01); *G05B 23/0262* (2013.01); *G05B 23/0275* (2013.01); *G05B 23/0278* (2013.01)

(58) Field of Classification Search
CPC ............ G05B 23/0262; G05B 23/0278; G05B 23/0275
See application file for complete search history.

(56) References Cited

U.S. PATENT DOCUMENTS

| 7,720,779 B1 * | 5/2010 | Perry | ....................... G06N 5/04 706/45 |
| 2004/0153864 A1 * | 8/2004 | Longere | .............. G06F 11/2257 714/46 |

(Continued)

FOREIGN PATENT DOCUMENTS

| FR | 2 855 634 | 12/2004 |
| WO | 2005 013098 | 2/2005 |
| WO | WO 2011104466 A1 * | 9/2011 | ............... F02K 9/96 |

OTHER PUBLICATIONS

International Search Report dated Sep. 25, 2013 in PCT/FR13/051107 Filed May 22, 2013.

*Primary Examiner* — Michael J Dalbo
(74) *Attorney, Agent, or Firm* — Oblon, McClelland, Maier & Neustadt, L.L.P.

(57) ABSTRACT

An information processor system for monitoring a complex system and including a mechanism receiving at least one piece of event detection information associated with a detection time and a mechanism generating at least one remanent confidence level value that decreases over time starting from the detection time.

10 Claims, 5 Drawing Sheets

(56) References Cited

U.S. PATENT DOCUMENTS

| | | | |
|---|---|---|---|
| 2004/0205398 A1* | 10/2004 | Osborn | G05B 23/0278 |
| | | | 714/25 |
| 2006/0149433 A1* | 7/2006 | Otsubo | F16H 61/12 |
| | | | 701/31.4 |
| 2006/0208870 A1 | 9/2006 | Dousson et al. | |
| 2007/0095138 A1* | 5/2007 | El-Bakry | G01H 1/00 |
| | | | 73/583 |
| 2010/0158670 A1* | 6/2010 | Fox | F23N 5/242 |
| | | | 415/118 |
| 2010/0313072 A1* | 12/2010 | Suffern | G06F 11/0793 |
| | | | 714/37 |
| 2011/0118905 A1* | 5/2011 | Mylaraswamy | G05B 23/0251 |
| | | | 701/3 |

* cited by examiner

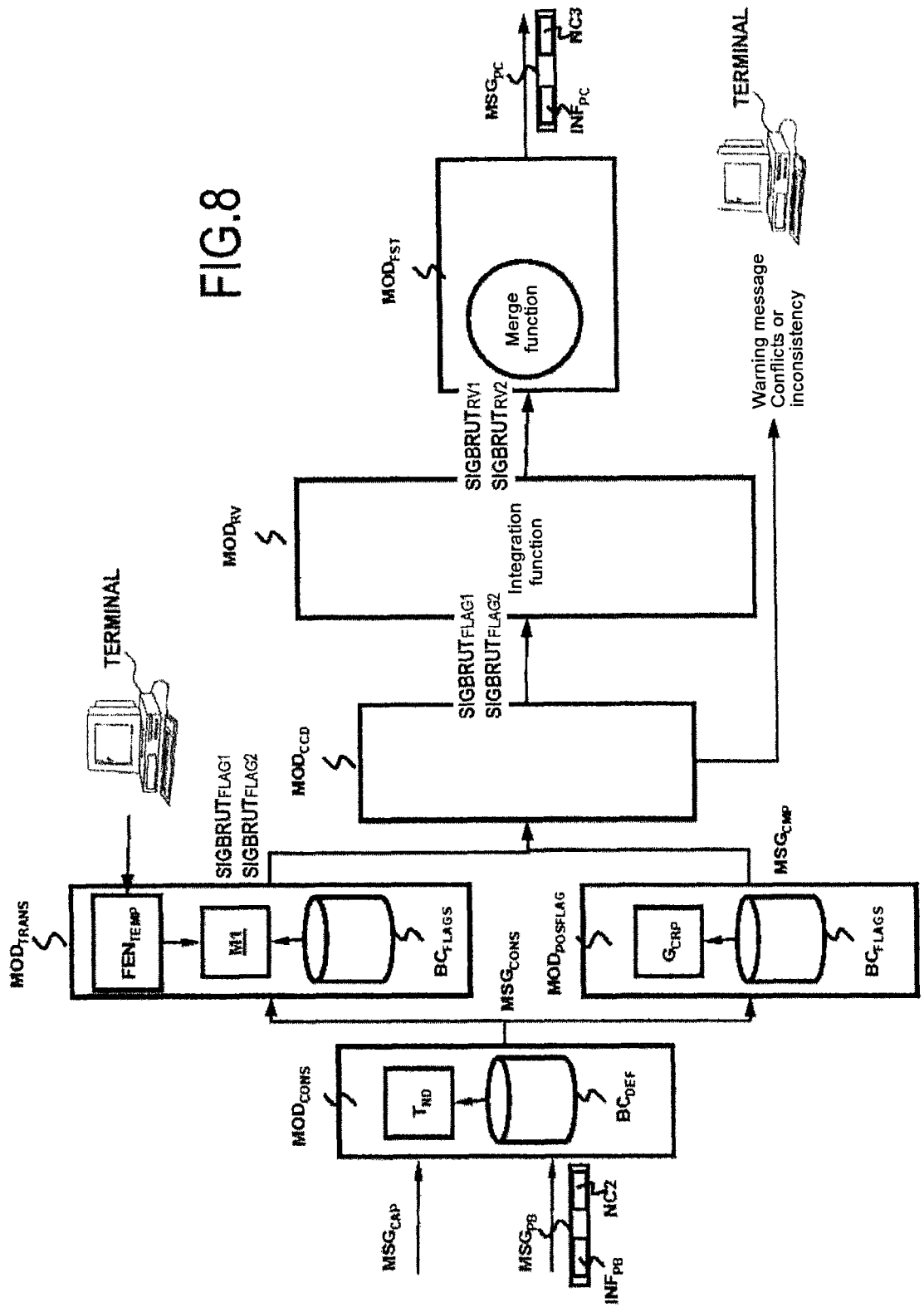

INFORMATION PROCESSOR SYSTEM FOR MONITORING A COMPLEX SYSTEM

TECHNICAL FIELD AND PRIOR ART

The invention lies in the field of systems and methods for monitoring complex systems, for detecting and analyzing signals representing malfunctions or abnormal situations. By way of example, the complex system being monitored may be a rocket engine.

In this field, fault indicators, known as "flags", are activated by one or more processes using a sensor or a set of sensors placed in given locations in the complex system and measuring one or more physical magnitudes whenever a variation is detected relative to a threshold.

Such fault flags may indicate a suspected fault relating to a component, a subsystem, a complete system, or sometimes to a sensor, or else to a fault that has been confirmed. They may take various magnitude values, e.g. on a discrete scale, going from a normal situation to an actual failure, with the magnitude value being associated with variation relative to one or more reference thresholds. When a sensor that has activated a fault flag no longer detects excessive variation relative to the reference threshold, then the magnitude value of the fault flag immediately begins to decrease.

In particularly advantageous manner, fault flags may be associated with respective confidence levels (NC) representing their imperfections (inaccuracies, uncertainties, or incompleteness, in particular). A confidence level may be determined in various ways, in particular by detecting bias in the signals from the sensors or by measuring noise in the signals, or indeed by detecting lack of symmetry, as mentioned in Document WO 2011/104466. Other elements may possibly be taken into account in order to determine a confidence level.

When the signals relating to a fault flag or to a set of fault flags are stable, and when the associated confidence level is not too small, it is known how to associate these signals with specific failures, thereby constituting diagnoses for making decisions concerning action to be taken by a human or automatically. These stable and clear signals constitute failure signatures.

Thus, Document WO 2011/104466 discloses associating one or more failure-defining consolidated messages with fault flags received in raw messages by merging the information from the raw messages, regardless of whether the messages are associated with component failures, with subsystem failures, with complete system failures, or with sensor failures.

Such merging of fault flags enables high-level decisions to be made. The flags for merging may constitute information that is redundant, complementary, consistent or inconsistent, symbolic, or digital. The confidence level of each fault flag is taken into account in the merging process.

Although such a merging process already enables highly reliable diagnoses to be obtained, it is also desirable when developing such failure diagnoses to take account of ephemeral signals that may be of small magnitude and that are less simple to interpret than flags or groups of flags constituting major failure signatures. Such ephemeral signals may in particular present little mutual coordination, thereby making the merging processes more difficult.

SUMMARY OF THE INVENTION

In order to take such ephemeral signals into account, the invention proposes an information processor system for monitoring a complex system and having means for receiving at least one piece of event detection information associated with a detection time, the system being characterized in that it also comprises means for generating at least one remanent confidence level value that decreases over time starting from said detection time. By means of this system, an ephemeral signal retains a degree of existence at instants following its disappearance, and this makes it possible, where appropriate, to perform a merging process with signals that are little coordinated with the processed ephemeral signal.

The following disclosure of the system also relates to a situation in which the remanent confidence level value is associated with at least one failure magnitude value that is selected as a function of a failure magnitude value associated with said detection time. The system thus takes account of the variable magnitude scales mentioned in the introduction. Nevertheless, the invention can be applied without making use of such a variable magnitude scale.

Attention is also given to the situation in which the remanent confidence level value is associated with a fault flag associated with said piece of event detection information. The signal is then ready to be subjected to merging with other fault flag signals. Nevertheless, in certain variants, remanent confidence level generation could take place before sensor signals have been confirmed in a fault flag.

Attention is also given to the situation in which, starting from the detection time, the remanent confidence level value decreases over time from a value that depends on an initial confidence level associated with the event detection message. It is thus possible in the remanent value to take account of confidence information generated by other methods.

An embodiment of the invention includes means for generating at least two remanent confidence level values, each associated with a malfunction magnitude value, each of the at least two remanent confidence level values varying independently of the other.

Another embodiment of the invention includes means for generating at least two remanent confidence level values each associated with a malfunction magnitude value, the remanent confidence level value among the at least two remanent confidence level values associated with the highest malfunction magnitude value or the lowest malfunction magnitude value being reset to zero if the other remanent confidence level value is not zero.

In a certain implementation of the invention, the remanent confidence level value is a raw value, that may be subjected to integration.

Under such conditions, an embodiment of the invention also includes means for generating an integrated remanent confidence level value of value at said detection time that is equal to the initial confidence level combined with the raw remanent confidence level value at said detection time, and of value at times that are not detection times that is zero.

Another embodiment of the invention also includes means for generating an integrated remanent confidence level value of value at all times equal to the initial confidence level combined with the raw remanent confidence level value.

In these two embodiments, the initial confidence level and the raw remanent confidence level value may be combined to give the integrated remanent confidence value, in particular by means of an addition.

In a particular embodiment of the invention, said piece of detection information associated with a detection time is included in a failure message including at least a failure time, an initial confidence level, and a failure identifier. All of the information that is needed is thus supplied in the form of a message to the module for generating the remanent confidence value.

For the user, it is more particularly advantageous for a duration from which the remanent confidence level value is zero to be settable by a user, for a single fault flag, or for a plurality of fault flags.

Likewise, for a user it is advantageous for it to be possible for the user to be able to set a decreasing relationship for the remanent confidence level value, for a single fault flag, or for a plurality of fault flags.

The invention also provides an information processing method for monitoring a complex system, the method comprising a step of receiving at least one piece of event detection information associated with a detection time, the method being characterized in that it further comprises a step of generating at least one remanent confidence level value that decreases over time starting from the detection time. This method presents advantages similar to those of the described system. It may be implemented in software form.

BRIEF DESCRIPTION OF THE FIGURES

FIGS. 4 to 7 show particular embodiments of the invention.

FIG. 8 is a general diagram of a detailed embodiment of the invention.

DETAILED DESCRIPTION OF EMBODIMENTS OF THE INVENTION

Figure 1:
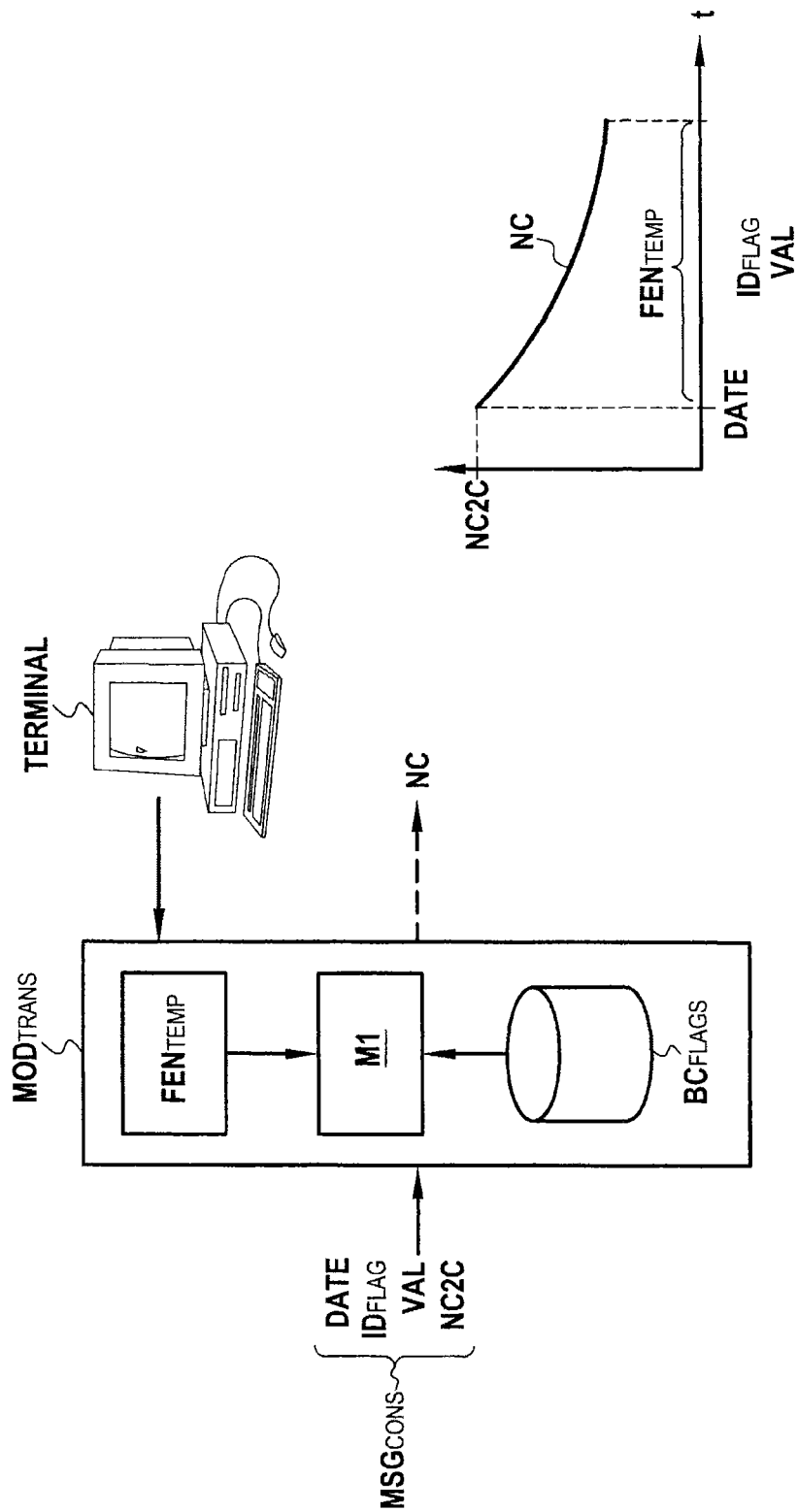
FIG. 1 shows a general embodiment of the invention.

FIG. 1 shows a module $MOD_{TRANS}$ that receives messages as input, in this example consolidated messages $MSG_{CONS}$. The "consolidated" nature of the messages $MSG_{CONS}$ refers to the fact that they have been subjected to preprocessing, e.g. by using a knowledge base concerning the architecture and the properties of the monitored system.

These messages $MSG_{CONS}$ are associated with a time stamp DATE, a fault flag identifier $ID_{FLAG}$, a malfunction magnitude value VAL, and a confidence level NC2C. The digit 2 in the notation NC2C indicates that this confidence level is a confidence level derived from a primitive confidence level, in one manner or another.

The malfunction magnitude value VAL may for example be selected from a discrete value space, such as for example the set 0, 1, 2, and 3. In the embodiment shown, the time stamp DATE, the identifier $ID_{FLAG}$, the value VAL, and the level NC2C are included in the message $MSG_{CONS}$.

The module $MOD_{TRANS}$ uses a knowledge base of fault flags $BC_{FLAGS}$ and a module M1 with magnitude and time axes for generating a raw time-varying fault flag signal $SIG_{BRUT}$, associated with the flag identifier $ID_{FLAG}$ and with the malfunction magnitude valve VAL. Unlike the messages $MSG_{CONS}$ which are received by the module $MOD_{TRANS}$ solely when a sensor detects an event, the signal $SIG_{BRUT}$ as generated by the module $MOD_{TRANS}$ is a continuous signal, varying as a function of time. As shown by the curve in the right-hand portion of FIG. 1, which is an illustrative simplification, it takes the value NC2C at the time DATE, and then decreases.

It is specified that the module $MOD_{TRANS}$ takes account of a variable selected by the user by means of a terminal. This variable is a time window $FEN_{TEMP}$, expressing a duration. Once the duration $FEN_{TEMP}$ has elapsed starting from the time DATE, the signal $SIG_{BRUT}$ is zeroed.

In a more sophisticated embodiment, the module $MOD_{TRANS}$ also takes account of a decreasing function selected by the user by means of the terminal, and the rate at which the signal $SIG_{BRUT}$ decreases is then defined by that function. It is specified that the decreasing function and the time window $FEN_{TEMP}$ may both be selected by the user in specific manner for each flag, as identified by its identifier $ID_{FLAG}$, and/or for each magnitude value VAL.

Figures 2, 3:
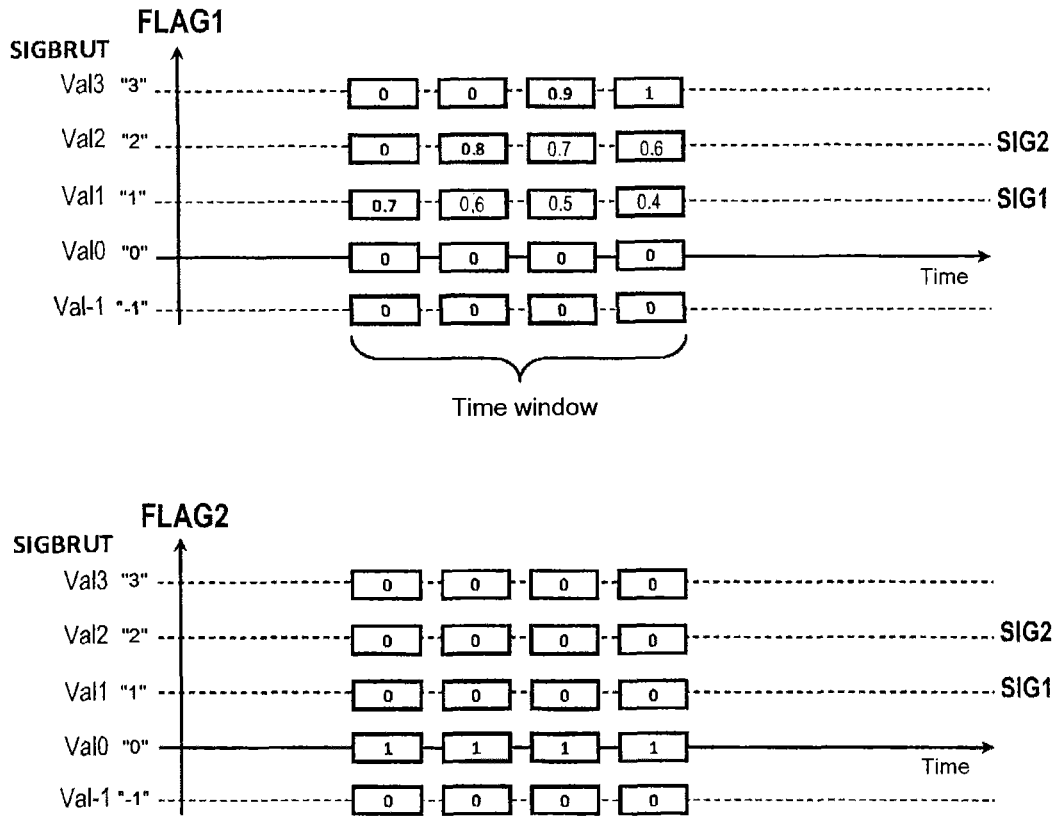
FIG. 2 shows the signals produced by a system of the invention in an embodiment of the invention.
FIG. 3 shows a general implementation aspect of the invention.

FIG. 2 shows the signals that are generated in parallel (simultaneously) by the module $MOD_{TRANS}$ for two different flags FLAG1 and FLAG2.

These two flags are presented with five different magnitude levels, namely levels Val-1, Val0, Val1, Val2, and Val3. The level Val-1 indicates that information is not available, while the levels 0 to 3 indicate the severity of the failure using the convention that the magnitudes have the following meanings respectively: "all's well"; "minor malfunction"; "severe malfunction"; and "failure".

For each flag and for each level of magnitude, a raw signal similar to the signal $SIG_{BRUT}$ shown in FIG. 1 is produced continuously by the module $MOD_{TRANS}$. Two particular signals are shown in FIG. 2 by way of example. These are signals SIG1 and SIG2. These signals decrease from an initial value taken at a particular time. Each of these signals comes progressively closer to zero once the duration corresponding to the time window $FEN_{TEMP}$ starts to elapse.

FIG. 3 shows a correspondence table of fault flags and failures, in an embodiment of the invention. In accordance with this table, fault flags for a given failure are merged by taking into consideration the fault flags that are given a "1" or some other value in the table, while ignoring those for which the table contains "0".

Figures 4, 5:
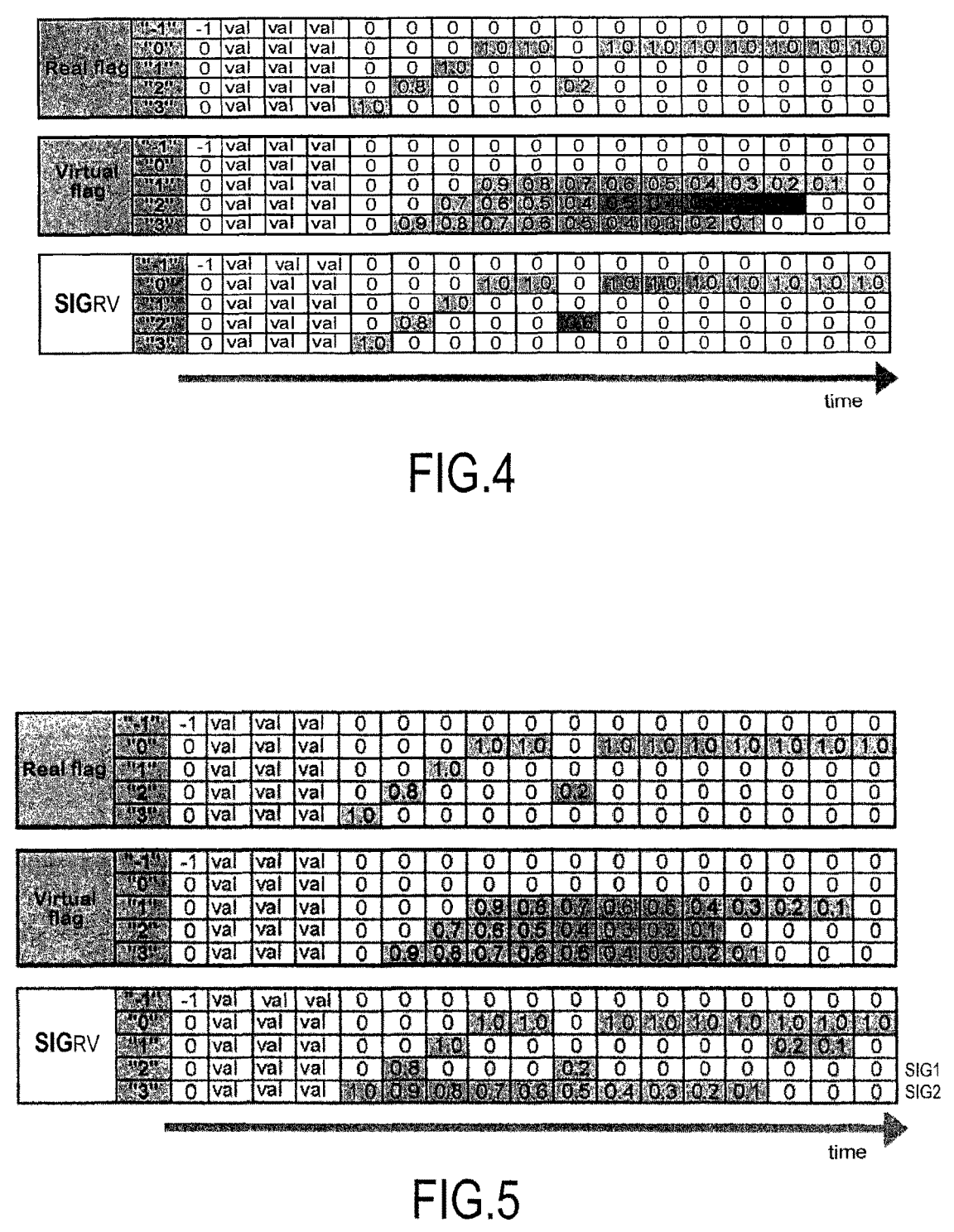

FIG. 4 shows how a fault flag is consolidated in a first embodiment of the invention. A real flag, constructed solely on the basis of information contained in the messages $MSG_{CONS}$ is shown in the top portion of the Figure. It can be seen that for each time, only one magnitude is activated. It corresponds to the magnitude VAL specified in the message $MSG_{CONS}$. It has a confidence level equal to that defined in the message $MSC_{CONS}$, namely NC2C. For times for which no message $MSG_{CONS}$ is received, all of the magnitudes in the flag have a confidence level of zero, other than the magnitude 0, which has a confidence level equal to 1.0.

Thereafter, a flag that is said to be "virtual" is shown in the middle portion of the figure. This is a remanent confidence flag as produced by the module $MOD_{TRANS}$ shown in FIG. 1. It can be seen that in the instants that follow reception of a message $MSG_{CONS}$, the corresponding magnitude is activated and has a confidence level that decreases from an initial value defined by the value NC2C contained in the message $MSG_{CONS}$. This is observed for the magnitudes 1, 2, and 3. The magnitude 0 remains at a confidence level that is continuously equal to 0 in this virtual flag.

The example of the figure shows a ephemeral reactivation of the magnitude "2" following a message $MSG_{CONS}$. In this scenario, the remanent confidence level is 0.4 at the time the message arrives, and it gives a confidence level of 0.2. The remanent confidence level then decreases from the sum of these two values, i.e. form 0.6. The first visible value is 0.5.

In its bottom portion, the figure shows a flag $SIG_{RV}$ resulting from integrating (or summing) the two above-described flags with the rule of keeping real and virtual flags separate (using a virtual space that is distinct from the real space). In this embodiment, the virtual flag is summed with the real flag only in the event of a change of magnitude in the real flag. Thus, the integrated flag value at a detection time defined by a message $MSG_{CONS}$ for a magnitude is equal to the initial confidence level contained in the message (NC2C) plus the value of the remanent confidence level at that instant, as given by the virtual flag. At times that are not detection times, the value of the integrated flag is zero.

It is specified that the initial confidence level (NC2C) could be combined with the value of the raw remanent confidence level in order to obtain the integrated remanent confidence value ($SIG_{RV}$) in a manner other than by simple addition.

In the scenario described, the integrated flag is thus equal to the real flag except at the time when the magnitude of 2 is reactivated, whereupon it takes as its value the sum of the confidence value of the real flag, i.e. 0.2, plus the confidence value of the virtual flag, i.e. 0.4, giving a value of 0.6.

FIG. 5 shows a fault flag being consolidated in accordance with a second embodiment of the invention. A real flag, identical to that shown in FIG. 4, is shown in the top portion of the figure. For times at which no message $MSG_{CONS}$ is received, all of the magnitudes of the flag have a confidence level of 0, except the magnitude 0, which has a confidence value equal to 1.0.

Thereafter, a virtual flag is shown in the middle portion of the figure. As in FIG. 4, at instants following the reception of a message $MSG_{CONS}$, the corresponding magnitude is activated and has a confidence level that decreases starting from an initial value defined by the value NC2C contained in the message $MSG_{CONS}$.

Thus, by way of example, when a message $MSG_{CONS}$ is received indicating a reactivation of the flag with a magnitude 2 and with a confidence level of 0.2, the real flag takes account of this, as in FIG. 4. In contrast, in the embodiment presently described, the virtual flag continues to vary in the same manner as before the message was received, without this magnitude 2 reactivation of the flag being taken into account. In this example, this option is selected by taking account of the fact that the remanent confidence level for the magnitude 2, in this example 0.4, is higher than that associated with the real flag, i.e. 0.2.

Finally, in its bottom portion, this figure shows a flag $SIG_{RV}$ resulting from integrating the two above-described flags using the rule of superposing the virtual and real spaces, making use of the most severe stored magnitude. In this embodiment, at each instant, the integrated flag is equal to the sum of the real flag plus the greatest activated magnitude of the virtual flag. Thus, those magnitudes of the virtual flag that are lower than an activated magnitude have their confidence levels reduced to 0. In the embodiment described, it can be seen that the magnitude 3 that was initially activated has a confidence value in the integrated flag that decreases progressively, as in the virtual flag. Conversely, the magnitudes 1 and 2, lower than the magnitude 3, have their respective confidence levels reduced to 0 as from the instant following the time of the message $MSG_{CONS}$ that activated them.

It is also specified at this point that the initial confidence level (NC2C) and the value of the raw remanent confidence level could be combined in order to obtain the integrated remanent confidence value ($SIG_{RV}$) in a manner other than by simple addition.

Figure 6:
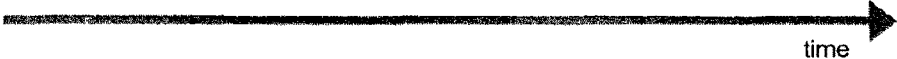

FIG. 6 shows a fault flag being consolidated in accordance with a third embodiment of the invention. A real flag, identical to that shown in FIGS. 4 and 5, is shown in the top portion of the figure. Thereafter, a virtual flag is shown in the middle portion of the figure. It is identical to the virtual flag shown in FIG. 5.

Finally, in its bottom portion, the figure shows a flag $SIG_{RV}$ resulting from integrating the two above-described flags using the rule of superposing the virtual and real spaces, but this time using the least severe stored magnitude. In this embodiment, the integrated flag is equal, at each instant, to the sum of the real flag and the lowest activated magnitude (excluding the magnitude 0) of the virtual flag. Thus, the magnitudes of the virtual flag that are higher than an activated magnitude have their confidence levels reduced to 0. In the embodiment shown, it can be seen that since the magnitude 1 was activated after the magnitude 3, in the integrated flag it has a confidence value that decreases progressively, as in the virtual flag, whereas the magnitude 3 has its confidence level returned to 0 starting from the instant following the activation of the magnitude 1.

It is specified once more than the initial confidence level (NC2C) and the value of the raw remanent confidence level may be combined to give the integrated remanent confidence value ($SIG_{RV}$) in some manner other than by simple addition.

Figure 7:
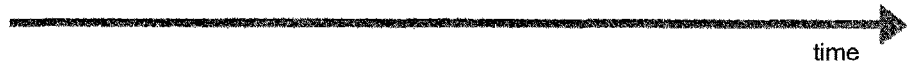

FIG. 7 shows a fault flag being consolidated in accordance with a fourth embodiment of the invention. A real flag, identical to that shown in FIGS. 4 to 6, is shown in the top portion of the Figure. A virtual flag is then shown in the middle portion of the figure. This virtual flag is identical to that shown in FIGS. 5 and 6.

Finally, in its bottom portion, the figure shows a flag $SIG_{RV}$ that results from integration in the two above-described flags using the rule of superposing the virtual and real spaces, but this time using all of the stored magnitudes. In this embodiment, the integrated flag is equal at each instant to the sum of the real flag plus the virtual flag. In the figure, it can be seen that a reactivation of magnitude 2 is taken into account, thereby giving rise in the integrated flag to a rise in the confidence level associated with this magnitude, after a first stage of progressive decrease and before a second stage of progressive decrease.

It is specified once more that the initial confidence level (NC2C) and the value of the raw remanent confidence level may be combined to give the integrated remanent confidence value ($SIG_{RV}$) in some manner other than by simple addition.

FIG. 8 shows an embodiment of a complete system implementing the invention. In particular, the complete system receives messages comprising fault flags, processes them, in particular for generating a remanent confidence level value, and merges them in order to obtain a failure diagnosis enabling a decision to be made by a human or automatically, concerning an action, e.g. a corrective action or a preventative action.

The input of the system is constituted by a module $MOD_{CONS}$ for consolidating raw messages $MSG_{PB}$ and $MSG_{CAP}$, which messages are received by this input module of the system. The first messages are state messages comprising a piece of state information $INF_{PB}$, comprising the identifier of a component, the identifier of a fault flag $ID_{FLAG}$, and a confidence level NC2, while the second messages relate to the states of sensors, which messages are also associated with confidence levels. The notation used is taken from Document WO 2011/104466.

The module $MOD_{CONS}$ makes use of a knowledge base $BC_{DEF}$ to extract a table concerning the severity of the malfunction $T_{ND}$ and it supplies a consolidated message $MSG_{CONS}$ including an ND2C malfunction magnitude on the scale 0, 1, 2, and 3. If the sensor in question is malfunctioning, the malfunction magnitude is −1, meaning that no information is available. A consolidated confidence level NC2C is also produced and inserted in the consolidated messages that are generated, as a function of the confidence levels received in the various messages $MSG_{PB}$ and $MSG_{CAP}$.

The messages $MSG_{CONS}$ are transmitted to the module $MOD_{TRANS}$, which uses them as mentioned with reference to FIG. 1, and thus continuously produces raw, time-varying signals of fault flags, $SIG_{BRUTFLAG1}$, $SIG_{BRUTFLAG2}$, etc.

The messages $MSG_{CONS}$ are transmitted to the flag positioning module $MOD_{POSFLAG}$, which makes use of a flag knowledge base $BC_{FLAGS}$ in order to position the messages $MSC_{CONS}$ on the correspondence table between flags and failures that defines the assembly comprising the engine, subsystems, and components, as shown by way of example in FIG. 3. Messages $MSG_{CMP}$ are thus larger than the messages $MSG_{CONS}$ as received and transmitted by the module. They include the identifiers of the failures with which the fault flag $ID_{FLAG}$ is associated by the knowledge base $BC_{FLAGS}$, and also the weight to be given to the flag during failure calculation.

The signals $SIG_{BRUT}$ generated by the module $MOD_{TRANS}$ and the messages $MSG_{CMP}$ generated by the module $MOD_{POSFLAG}$ are directed to a module $MOD_{CCD}$ for managing conflicts, resolving inconsistencies, and looking for correlations. In certain embodiments, if there is a conflict or an inconsistency, this module can send a warning signal to a terminal used by an operator.

The signals are then directed to a module $MOD_{RV}$ that integrates the real flags (received from the module $MOD_{POSFLAG}$) and the virtual flags (received from the module $MOD_{TRANS}$), as described above with reference to FIGS. 4 to 7. It produces the signals $SIG_{BRUTRV1}$, $SIG_{BRUTRV2}$, etc., for each fault flag. Finally, the information is transmitted to a merge module $MOD_{FST}$, which proceeds to merge the various flags in order to obtain failure information $INF_{PC}$ with confidence levels NC3. This data is included in consolidated failure messages $MSG_{PC}$.

The invention is described above with reference to particular embodiments, however it is not limited thereto. It covers all variants that come within the ambit of the scope of the claims.

The invention claimed is:

1. An sensor system for monitoring a complex system comprising:
   at least one sensor placed in a particular location in the complex system and configured to detect one or more physical magnitudes whenever a variation is detected relative to a threshold;
   processing circuitry configured to
      receive at least one piece of event detection information from the at least one sensor associated with a detection time, a fault flag being associated with the at least one piece of event detection information, where the received at least one piece of event detection information includes a magnitude level of a fault indicated by the fault flag and an initial confidence level;
      generate at least one remanent confidence level value that decreases from the initial confidence level over time starting from the detection time, the remanent confidence level value being associated with the fault flag and the magnitude level associated with the received at least one piece of event detection information; and
      when a new piece of event detection information is received that is associated with the fault flag and includes an initial confidence level and a same magnitude level as the at least one piece of event detection information, generate an integrated remanent confidence level value for the new piece of event detection information which is based on the initial confidence level that is included in the new piece of event detection information and the remanent confidence level value that exists at a time when the new piece of event detection information is received,
   wherein the at least one piece of detection information associated with a detection time is included in a failure message including at least a failure time, the initial confidence level, and a failure identifier.

2. The sensor system according to claim 1, wherein the remanent confidence level value is associated with at least one failure magnitude value selected as a function of a failure magnitude value associated with the detection time.

3. The sensor system according to claim 1, wherein the processing circuitry is configured to generate at least two remanent confidence level values, each associated with a malfunction magnitude value, each of the at least two remanent confidence level values varying independently of the other.

4. The sensor system according to claim 1, wherein the processing circuitry is configured to generate at least two remanent confidence level values each associated with a different malfunction magnitude value, and reset to zero one of the at least two remanent confidence level values that was non-zero at a previous time when the other remanent confidence level value becomes non-zero at a current time.

5. The sensor system according to claim 1, wherein, the remanent confidence level value is a raw value.

6. The sensor system according to claim 1, wherein the initial confidence level and the raw remanent confidence level value are combined to give the integrated remanent confidence value by an addition.

7. The sensor system according to claim 1, wherein a duration from which the remanent confidence level value is zero may be set by a user, for a single fault flag, or for a plurality of fault flags.

8. The sensor system according to claim 1, wherein a decreasing relationship may be set by a user for the remanent confidence level value, for a single fault flag, or for a plurality of fault flags.

9. The sensor system according to claim 1, wherein the complex system is an engine.

10. An sensing method for monitoring a complex system, the method comprising:
   detecting, by at least one sensor placed in a particular location in the complex system, one or more physical magnitudes whenever a variation is detected relative to a threshold
   receiving at least one piece of event detection information from the at least one sensor associated with a detection time, a fault flag being associated with the at least one piece of event detection information, where the received at least one piece of event detection information includes a magnitude level of a fault indicated by the fault flag and an initial confidence level;
   generating at least one remanent confidence level value that decreases from the initial confidence level over time starting from the detection time, the remanent confidence level value being associated with the fault flag and the magnitude level associated with the received at least one piece of event detection information; and when a new piece of event detection information is received that is associated with the fault flag and includes an initial confidence level and a same magnitude level as the at least one piece of event detection information, generating an integrated remanent confidence level value for the new piece of event detection information which is based on the initial confidence level that is included in the new piece of event detection information and the remanent confidence level value that exists at a time when the new piece of event detection information is received, wherein the at least one piece of detection information associated with a detection time is included in a failure message including at least a failure time, the initial confidence level, and a failure identifier.

* * * * *